United States Patent [19]

Taguchi

[11] Patent Number: 5,622,325
[45] Date of Patent: Apr. 22, 1997

[54] REEL LOCK MECHANISM FOR LOCKING TAPE REELS IN A TAPE CASSETTE

[75] Inventor: Osamu Taguchi, Miyagi, Japan

[73] Assignee: Sony Corporation, Tokyo, Japan

[21] Appl. No.: 502,780

[22] Filed: Jul. 14, 1995

[30] Foreign Application Priority Data

Jul. 15, 1994 [JP] Japan .................................. 6-164312

[51] Int. Cl.$^6$ ............................................. G11B 23/087
[52] U.S. Cl. ............................................. 242/343
[58] Field of Search .............................. 242/343, 343.1, 242/343.2; 360/132; 29/450, 806

[56] References Cited

U.S. PATENT DOCUMENTS

| | | | |
|---|---|---|---|
| 4,225,100 | 9/1980 | Sugawara | 29/806 |
| 4,524,596 | 6/1985 | Tsunekawa et al. | |
| 4,903,915 | 2/1990 | Iwahashi | 360/132 |
| 5,224,005 | 6/1993 | Fujii | 242/343 |
| 5,297,753 | 3/1994 | Abe . | |
| 5,348,244 | 9/1994 | Nakagawa | 242/338.3 |
| 5,433,398 | 7/1995 | Sawada | 242/343.2 |
| 5,454,527 | 10/1995 | Mizutani et al. | 242/343 |
| 5,506,739 | 4/1996 | Iwahashi | 360/132 |

FOREIGN PATENT DOCUMENTS

| | | | |
|---|---|---|---|
| 0169514 | 1/1986 | European Pat. Off. . | |
| 62-75989 | 4/1987 | Japan | 360/132 |
| 2099400 | 12/1982 | United Kingdom . | |

*Primary Examiner*—John P. Darling
*Attorney, Agent, or Firm*—William S. Frommer; Alvin Sinderbrand

[57] ABSTRACT

In a reel lock mechanism for a tape cassette in which a ratchet opening spring can be easily attached to reel lock ratchets, the ratchet opening spring (14) includes two coil portions (14a, 14b) mounted on shaft portions (20d, 20d) of a pair of reel lock ratchets (12, 13) and a pair of ratchet opening arms (14d, 14e) for spring-biasing ratchet portions (20c, 20c) toward ratchet wheels (8, 8) on the tape reels (2a, 3a). The pair of reel lock ratchets (12, 13) include a ratchet-side stopper (20f) and a reel lock body (11) includes a body-side stopper (11e) which can be engaged with the ratchet-side stopper (20f). When the ratchet-side stopper (20f) and the body-side stopper (11e) are engaged with each other, the ratchet opening spring (14) generates a spring force to bias the pair of reel lock ratchets (12, 13) under such spring force.

5 Claims, 7 Drawing Sheets

REEL LOCK MECHANISM FOR LOCKING TAPE REELS IN A TAPE CASSETTE

CROSS-REFERENCE TO RELATED APPLICATIONS

The present application is related to Japanese patent applications Nos. 04-217550, 04-332165 filed on Jul. 24, 1992 and Nov. 19, 1992 (corresponding U.S. patent applications are now co-pending) by the same assignee of this application, the disclosure of which is hereby incorporated by reference, and to U.S. Pat. Nos. 4,903,915, 5,348,244, 5,297,753.

BACKGROUND OF THE INVENTION

The present invention relates to a reel lock mechanism for a tape cassette in which a pair of tape reels accommodated within a cassette housing can be prevented from being rotated by engagement between ratchet wheels formed on outer peripheral portions of the tape reels and a ratchet when the tape cassette is not in use and a method of assembling the reel lock mechanism.

Tape cassettes for use with video recording and/or reproducing apparatus, such as a video cassette recorder (VCR) and an 8-mm video cassette recorder (8-mm VCR), including a reel lock mechanism for preventing rotation of a pair of tape reels having a magnetic tape wound thereon when they are not in use.

A reel lock mechanism is generally composed of a reel lock body, a pair of reel lock ratchets, a ratchet opening spring and a slide spring. The reel lock body can be moved close to or away from a pair of supply and take-up reels under the spring force of the slide spring. The reel lock body has at its right and left portions the pair of reel lock ratchets pivotally supported thereon. The pair of reel lock ratchets are opened outward under the spring force of the ratchet opening spring and ratchet portions formed at the tip ends of the reel lock ratchets are meshed with the ratchets formed on the outer peripheral portions of the pair of reels.

In the above-mentioned tape cassette, the ratchet opening spring for the pair of reel lock ratchets has two coil portions. Therefore, when the reel lock mechanism having such shaped ratchet opening spring is assembled, the following two assembly methods have been proposed.

The first assembly method encounters the following problem. Because the ratchet opening spring has two coil portions, initially, only one coil portion is attached to a shaft portion of one reel lock ratchet by twisting an arm of the coil portion. Then, under the condition that the arm of the coil portion which has been attached to the shaft portion of one reel lock ratchet can be prevented from being disengaged from the shaft portion, the other coil portion is attached to a shaft portion of the other reel lock ratchet by twisting an arm of the other coil portion. During assembly, those who assemble the tape cassettes have to do two kinds of operations at the same time. Therefore, if those who assemble the tape cassettes are not skillful, the ratchet opening spring will not be attached to the shaft portion of the reel lock ratchet. Therefore, the assembly of the tape cassette needs a skillful worker.

The second assembly method encounters the following problem. Initially, the two coil portions of the ratchet opening spring are installed on the shaft portions of the right and left reel lock ratchets. Then, the right and left arms are respectively engaged with spring engagement ribs under twisting force. If a tape cassette is small, then assemblies thereof also are small and hence the arms of the ratchet opening spring are not long enough to be readily picked up when the arms are engaged with the spring engagement ribs. As a result, the ease of effecting the assembly is not satisfactory.

SUMMARY OF THE INVENTION

In view of the foregoing, it is an object of the present invention to provide a reel lock mechanism for tape reels in which a ratchet opening spring can be easily attached to a reel lock ratchet.

According to an aspect of the present invention, there is provided a reel lock mechanism for a cassette tape which is comprised of a reel lock body which can be moved in the front and back direction with respect to a pair of tape reels on which end portions of a magnetic tape are wound, a pair of reel lock ratchets supported on the reel lock body so as to be rotatable about respective supporting shafts and having ratchet portions formed at tip ends thereof, and a ratchet opening spring supported on shaft portions of the pair of reel lock ratchets and biasing the ratchet portions toward the pair of reels under spring force so that the ratchet portions become meshed with ratchet wheels formed on outer peripheral portions of the tape reels, wherein the ratchet opening spring includes supporting portions supported on the pair of reel lock ratchets and rachet opening arms for biasing the ratchet portions under spring force, the pair of reel lock ratchets include ratchet-side stoppers and the reel lock body includes body-side stoppers which can be engaged with the ratchet-side stoppers.

According to another aspect of the present invention, the shaft portions on the reel lock ratchets are coaxial with the supporting shafts on which the respective reel lock ratchets are pivotably mounted, and the ratchet opening spring includes a pair of coil portions mounted on the shaft portions of the reel lock ratchets, a coupling arm extending between the coil portions and ratchet opening arms extending from the coil portions and acting against engagement ribs on the respective reel lock ratchets for biasing the ratchet portions toward the ratchet wheels, with the movements of the ratchet portions under the spring force of the ratchet opening arms being limited by engagement with each other of respective stopper members on the reel lock body and the reel lock ratchets.

DETAILED DESCRIPTION OF THE PREFERRED EMBODIMENT

A reel lock mechanism for tape reels and a method of assembling the reel lock mechanism according to an embodiment of the present invention will be described with reference to the accompanying drawings.

Figure 8:
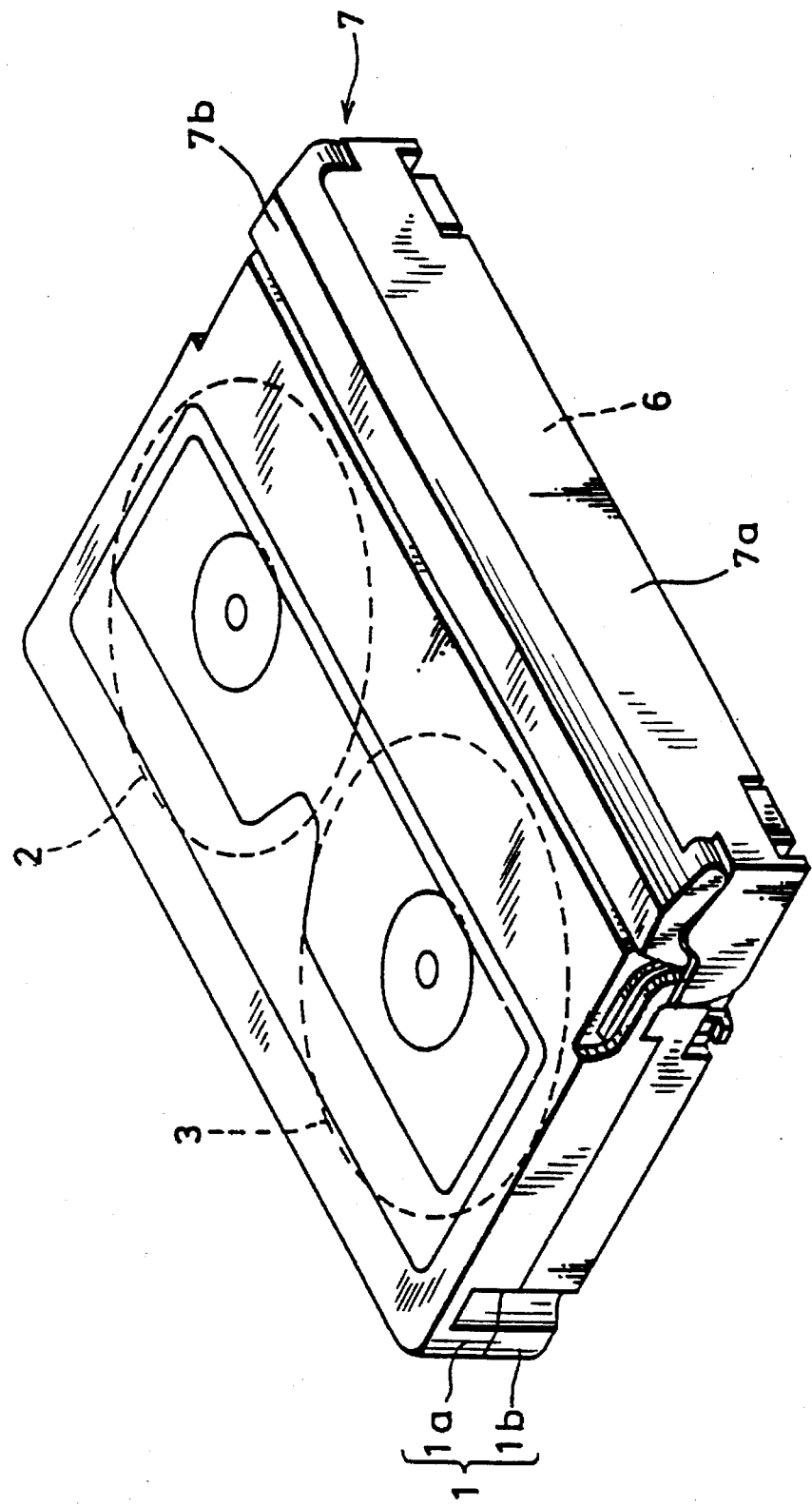
FIG. 8 is a perspective view showing an overall arrangement of a tape cassette with its front lid closed and to which the present invention is applied.
Figure 9:
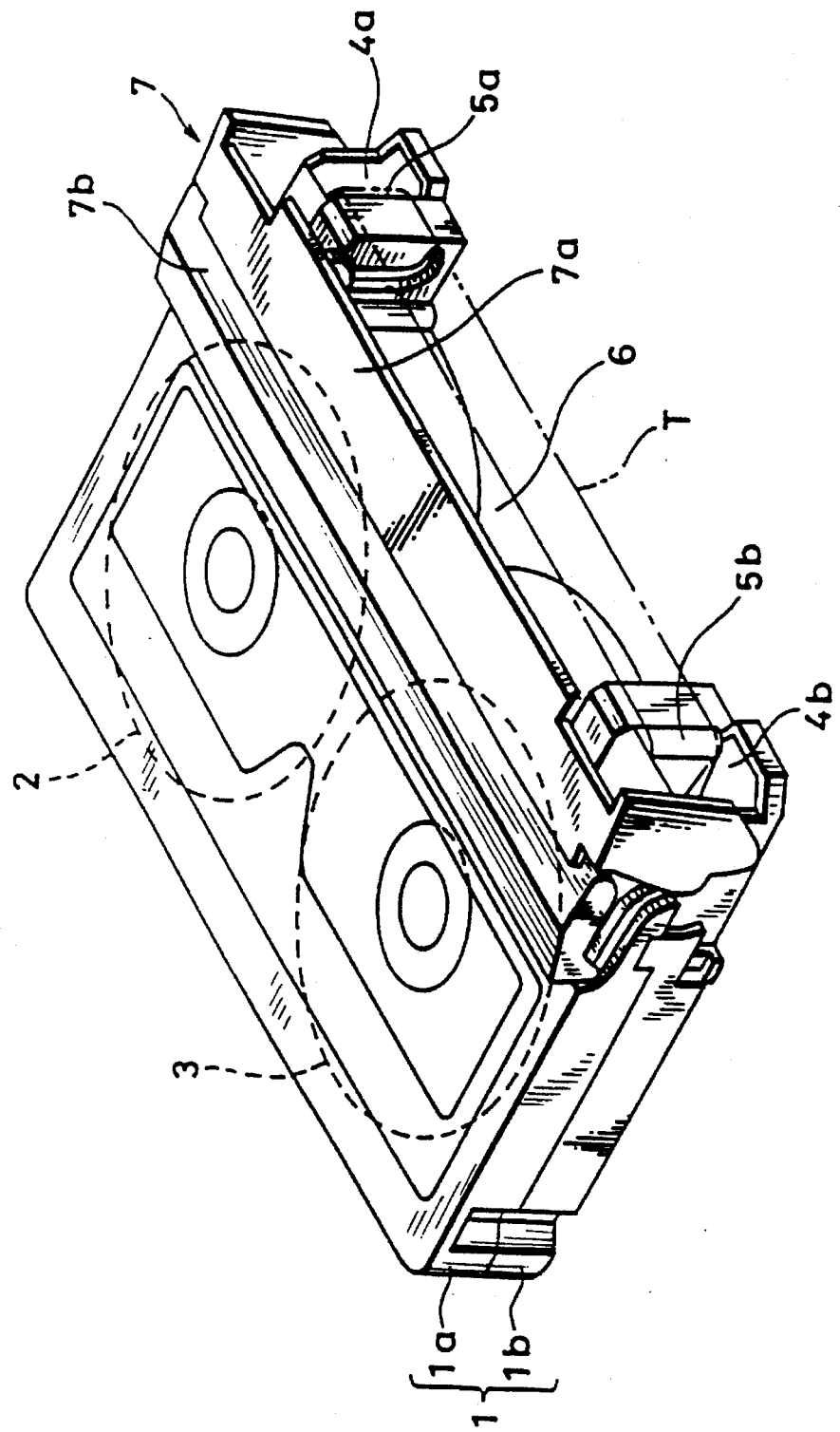
FIG. 9 is a perspective view similar to the of FIG. 8, but showing the tape cassette with its front lid opened.

As shown in FIGS. 8 and 9, a tape cassette according to the present invention includes a cassette hosing 1 made of a synthetic resin having a proper rigidity, such as PP (polypropylene), ABS (acrylonitrile butadiene styrene) and HIPS (high-impact polystyrene). The cassette housing 1 is composed of an upper cassette shell (half) 1a and a lower cassette shell (half) 1b joined by some suitable means.

The cassette housing 1 accommodates a supply-reel 1 and a tape-up reel 3 such that the supply-reel 2 and the take-up reel 3 can become freely rotatable. One end of a magnetic tape T serving as a recording medium is wound around the supply-reel 2 and the other end of the magnetic tape T is wound around the take-up reel 3. The magnetic tape T supplied from the supply-reel 2 is guided across a mouth 6 formed at the front portion of the cassette housing 1 between end structures 4a and 4b by means of a tape guide 5a provided on end structure 4a and a tape guide 5b on the other end structure 4b prior to being rewound on the take-up reel 3.

The cassette housing 1 has at its front portion a lid assembly 7 pivoted on end structures 4a and 4b so that the lid assembly 7 can close and/or open the mouth portion 6 and the right and left end portions 4a, 4b. When the lid assembly 7 is closed, the lid assembly 7 covers and protects the magnetic tape T extended along the front surface of the cassette housing 1. The lid assembly 7 is composed of three lids, i.e., a front lid 7a covering the front surface of the magnetic tape T, a top lid 7b covering the upper surface of the magnetic tape T and a back lid (not shown) covering the rear surface of the magnetic tape T.

Figure 1:
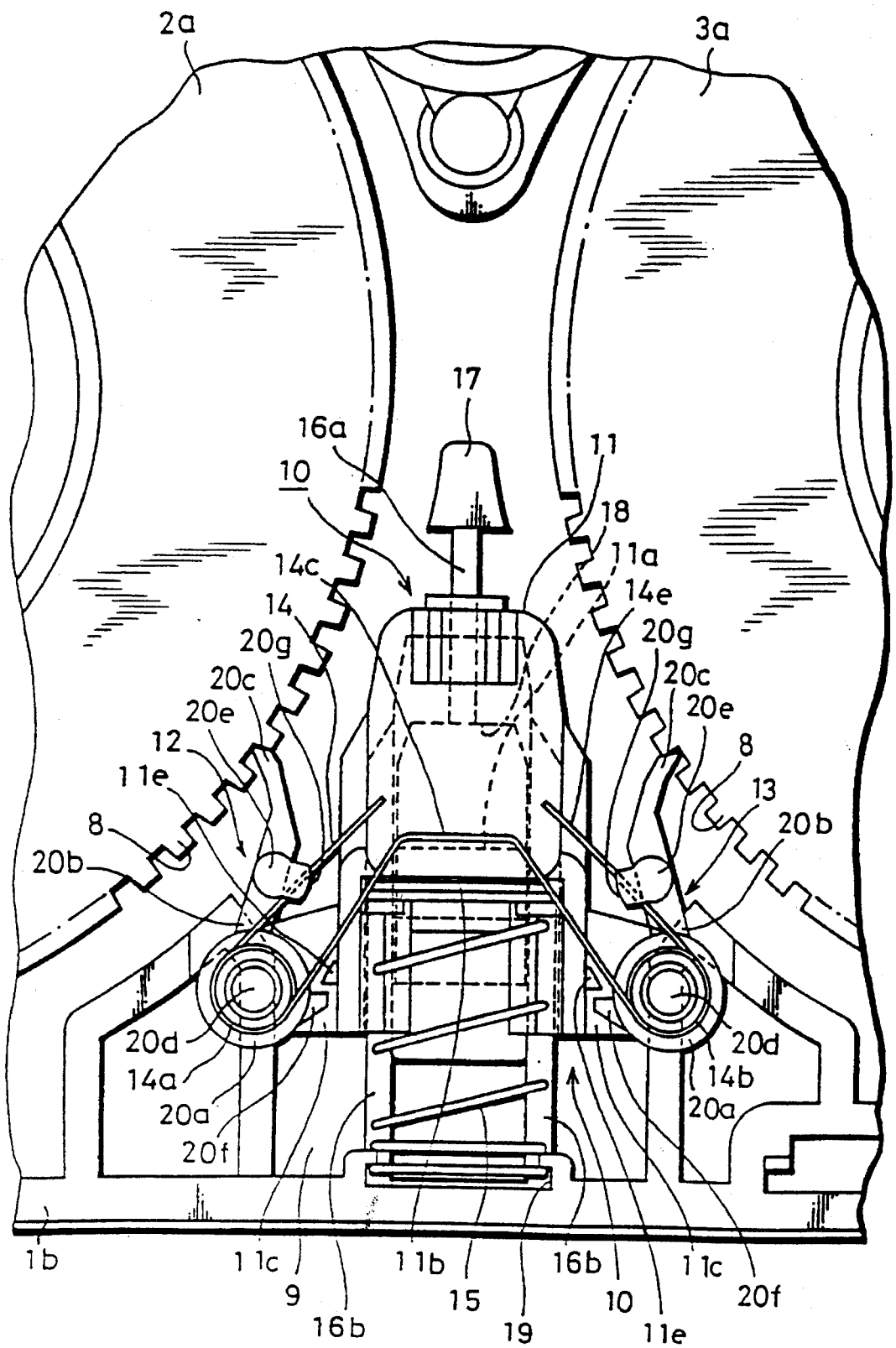
FIG. 1 is a plan view showing a reel lock mechanism for tape reels according to an embodiment of the present invention.

A pair of tape reels rotatably accommodated within the cassette housing 1, i.e., the supply-reel 2 and the take-up reel 3 are composed of lower flanges 2a, 3a having unitary reel hubs (not shown) and upper flanges (not shown) provided in parallel to the lower flanges 2a, 3a across the reel hubs. The lower flanges 2a, 3a have ratchet wheels 8 formed on their outer peripheral edges. As shown in FIG. 1, the cassette housing 1 includes a centrally located reel lock accommodating portion 9 adjacent its rear side. The reel lock accommodating portion 9 has a reel lock mechanism 10 disposed therein such that the reel lock mechanism 10 can be moved in the front and rear directions of the cassette housing 1, i.e., the reel lock mechanism 10 can be moved back and forth with respect to tangents to the two tape reels 2, 3.

The reel lock mechanism 10 is composed of a reel lock body 11, a pair of reel lock ratchets 12, 13 and a ratchet opening spring 14 as shown in FIGS. 1 to 4. As illustrated, the reel lock body 11 is composed of a slide operation portion 11a (FIG. 1) opened to the lower surface, a spring holding portion 11b for engaging and holding a front end portion of a slide spring 15 which spring-biases the reel lock body 11 forward, a pair of bracket portions 11c, 11c projected toward the left and right portions thereof and a pair of support shafts 11d, 11d projected upward from the bracket portions 11c, 11c. The reel lock body 11 has on its side surfaces body-side stoppers 11e, 11e disposed so as to oppose the rotary shafts 11d, 11d.

The reel lock body 11 has formed in its lower surface a plurality of guide slits 11f, 11f extended in the front and back direction. These guide slits 11f, 11f are slidably engaged with guide rails 16b, 16b (FIG. 1) formed on the lower cassette shell 1b, whereby the reel lock body 11 can be moved straight in the front and back direction.

A stopper 17 is provided at the tip end portion of a central guide rail 16a to limit a forward movement of the reel lock body 11. The lower cassette shell 1b has an operation window 18 defined from the rear end of the guide rail 16a to the rear surface side for access to the reel lock body 11 in moving the latter in the front and back direction. The slide operation portion 11a of the reel lock body 11 is opposed to the operation window 18 so that, when this tape cassette is loaded onto an audio mechanical deck (not shown), a release pin (not shown) of the mechanical deck is inserted into the slide operation portion 11a of the reel lock body 11 through the operation window 18. When the release pin of the mechanical deck is inserted into the slide operation portion 11a, the reel lock body 11 is moved backward to release the locked state of the reel lock mechanism 10.

A front end portion of a slide spring 15 formed of a compression spring is engaged with and held at the spring holding portion 11b of the reel lock body 11. A rear end portion of the slide spring 15 is engaged with and held at a spring holding portion 19 provided on the lower cassette shell 1b. Under spring force of the slide spring 15, the reel lock body 11 is constantly biased forward so as to approach the pair of supply and take-up reels 2 and 3.

Figure 2:
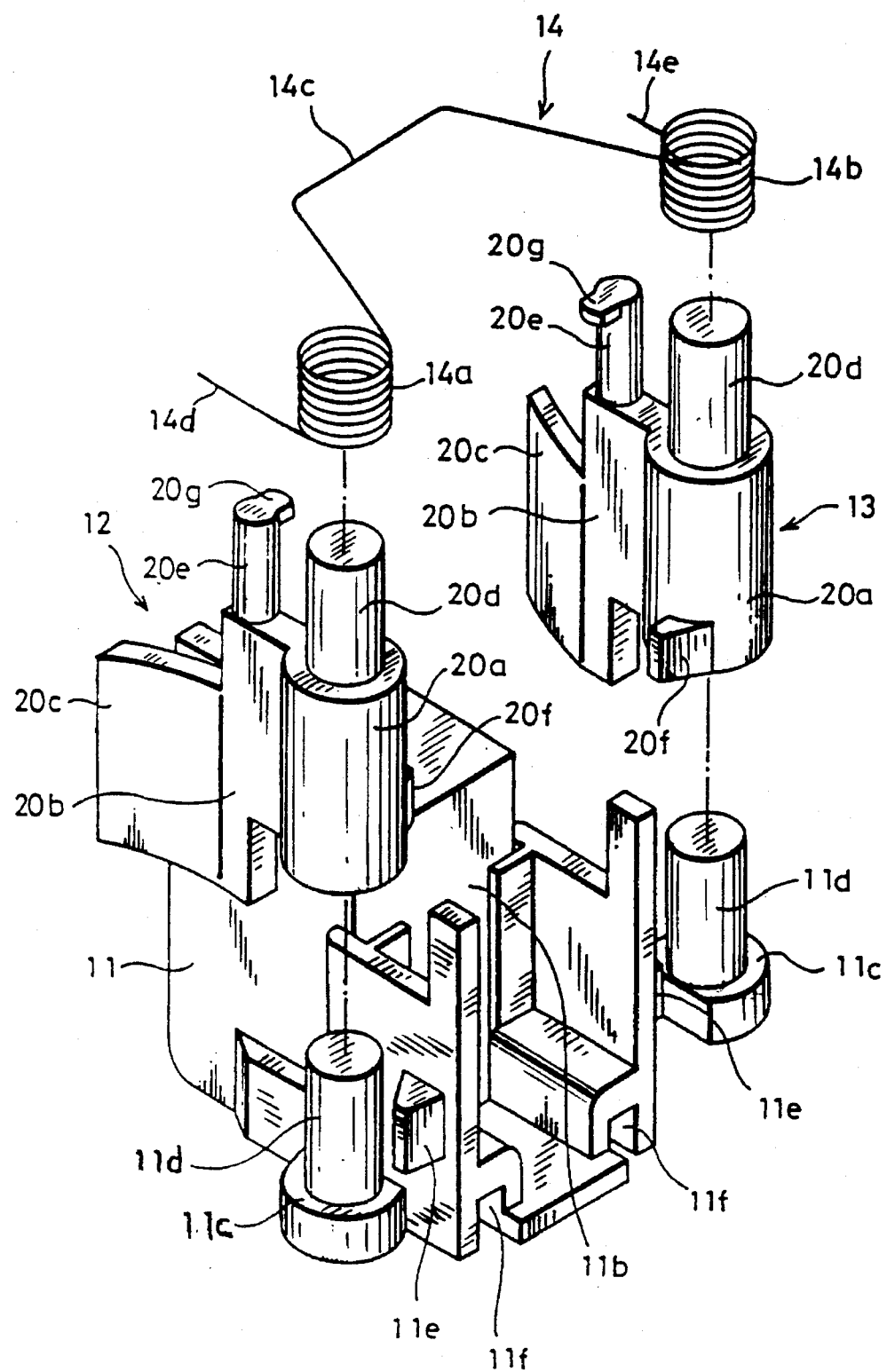
FIG. 2 is an exploded perspective view of the reel lock mechanism of FIG. 1.
Figure 3:
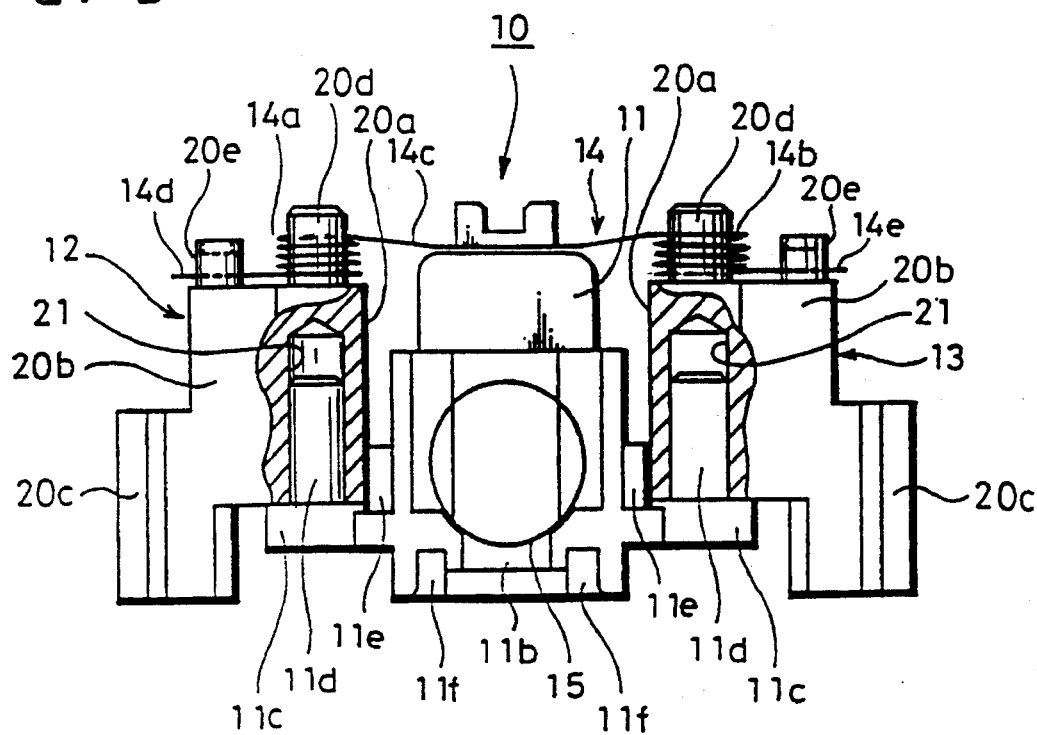
FIG. 3 is a rear view thereof.
Figure 4:
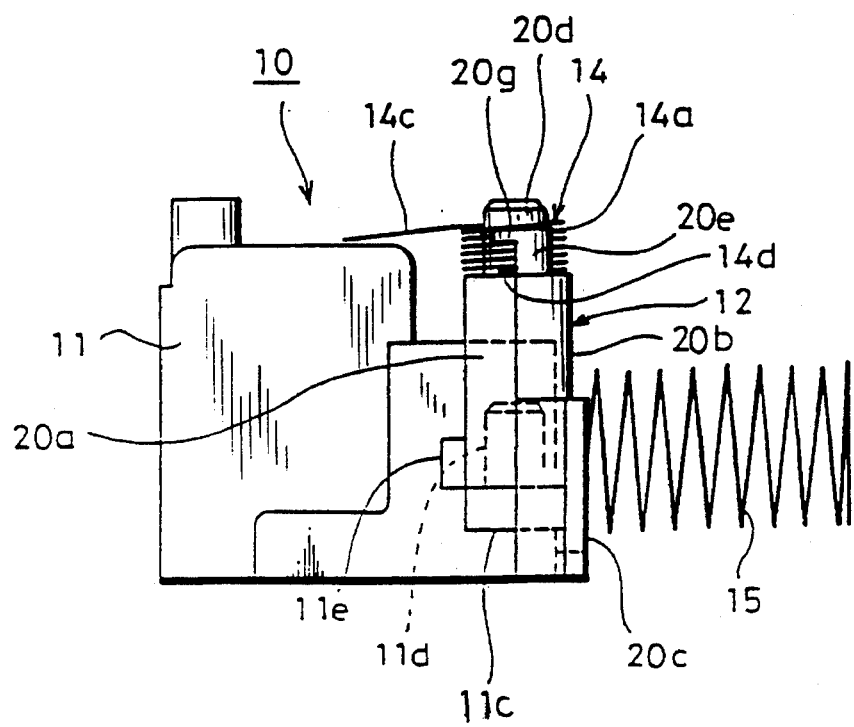
FIG. 4 is a left-hand side view thereof.

As shown in FIG. 2, the above-mentioned ratchet opening spring 14 is composed of a pair of coil portions 14a, 14b which, in the specific example shown, form supporting portions and each of which has a suitable number of turns or windings, a coupling arm or bail 14c connected to one end of the coil portions 14a, 14b to couple the two coil portions 14a, 14b and ratchet opening arms 14d, 143 extending from other ends of the coil portions 14a, 14b. The two coil portions 14a, 14b are wound in the opposite directions (the right-hand side coil portion 14a is wound in the clockwise direction and the left-hand side coil portion 14b is wound in the counter-clockwise direction in FIG. 1 in this embodiment) so as to generate spring forces in the opposite directions.

Specifically, the two coil portions 14a, 14b are connected at their upper ends by the coupling arm 14c which is generally U-shaped so as to project forward from coil portions 14a, 14b. The pair of ratchet opening arms 14d, 14e are projected forward from the lower ends of the two coil portions 14a, 14b. The lateral spacing between the two coil portions 14a and 14b is set to be substantially equal to a spacing between the pair of rotary shafts 11d, 11d of the reel lock body 11.

The pair of reel lock ratchets 12, 13 are composed of cylindrical portions 20a, 20a having downwardly opening axial bores 21, 21 into which are rotatably fitted the support shafts 11d, 11d of the reel lock body 11, arm portions 20b, 20b extending forwardly along the cylindrical portions 20a, 20a, ratchet portions 20c, 20c coupled to the tip end portions of the arm portions 20b, 20b, shaft portions 20d, 20d projected from the upper ends of the cylindrical portions 20a, 20a, spring engagement ribs 30e, 30e projected from the upper ends of the arm portions 20b, 20b and ratchet-side stoppers 20f, 20f projected from the inside surfaces of the cylindrical portions 20a, 20a.

The shaft portions 20d, 20d of the reel lock ratchets 12, 13 have axes concentric with center lines of the bores 21, 21 of the cylindrical portions 20a, 20a. Further, the ratchet-side stoppers 20f, 20f are formed on the reel lock ratchets 12, 13 at positions which are substantially at right angles to the arm portions 20b, 20b. Overhang portions 20g, 20g are formed on the upper ends of the spring engagement ribs 20e, 20e in order to prevent inadvertent disengagement of the ratchet opening arms 14d, 14e from the shaft portions 20d, 20d.

The reel lock mechanism 10 configured as described above can be easily assembled as shown in FIGS. 5 to 7 as follows. Since assembly operations of the left and right reel lock ratchets 12, 13 are similar to each other, the right-hand side half will not be described, and only assembly of the left-hand portion will be described below with reference to FIGS. 5 to 7.

The bores 21 of the reel lock ratchets 12,13 are respectively fitted over the left and right supporting shafts 11d, 11d of the reel lock body 11 to thereby pivotally support the pair of reel lock ratchets 12, 13 on the respective sides of the reel lock body 11. In this case, the pair of reel lock ratchets 12, 13 are assembled such that the ratchet portions 20c, 20c are directed toward the outside, i.e., the left-hand side reel lock ratchet 12 is assembled to the left-hand side of the reel lock body 11 and that the right-hand side reel lock ratchet 13 is assembled to the right-hand side of the reel lock body 11, respectively.

Figure 5:
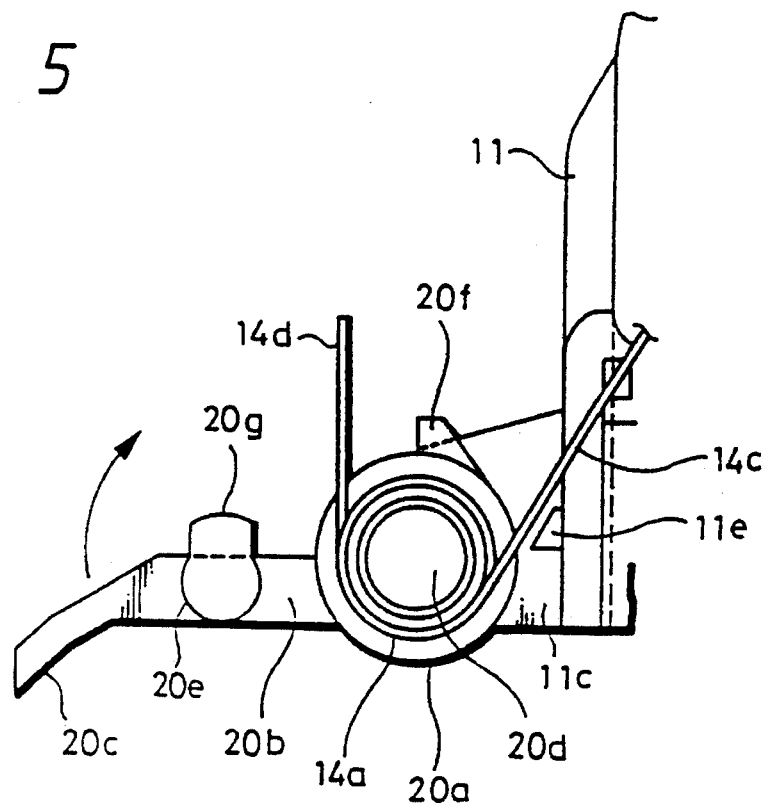
FIG. 5 is a fragmentary-plan view used to explain an action of the present invention and the state that a ratchet opening spring is attached.

Then, as shown in FIG. 5, with the ratchet portions 20c, 20c of the reel lock ratchets 12, 13 being directed toward the outside, the two coil portions 14a, 14b of the ratchet opening spring 14 are fitted onto the shaft portions 20d, 20d of the two reel lock ratchet 12, 13 with the ratchet opening arms 14d, 14e at the lower ends of the respective coil portions 14a, 14b. In this case, the tip end portion of the coupling arm 14c of the ratchet opening spring 14 comes to rest on the upper surface of the reel lock body 11. Further, since the spacing between the left and right shaft portions 20d, 20d is the same as that provided between the two coil portions 14a and 14b, the ratchet opening spring 14 can be fitted onto the reel lock ratchets 12, 13 in the free state, i.e., without applying a twisting force to the two coil portions 14a, 14b.

Subsequently, as shown in FIG. 5, the arm portion 20b and the ratchet portion 20c are rotated forward about the support shaft 11d such that the left and right reel lock ratchets 12, 13 are simultaneously directed forwardly at the front side of the reel lock body 11. Specifically, the left-hand side reel lock ratchet 12 shown in FIG. 5 is rotated in the clockwise direction and the right-hand side reel lock ratchet 13, not shown, is rotated in the counter-clockwise direction.

When the reel lock ratchet 12 is rotated as described above, and as shown in FIG. 6, the spring engagement rib 20e formed on the arm portion 20b contacts with the ratchet opening arm 14d (14e) of the ratchet opening spring 14. Then, as the reel lock ratchet 12 is further rotated in this state, the coil portion 14a (14b) is twisted in accordance with the increase of the rotated amount of the reel lock ratchet 12 and the spring-biasing force of the ratchet opening arm 14d (14e) increases. Then, when the reel lock ratchet 12 is rotated a predetermined amount after the spring engagement rib 20e has contacted with the ratchet opening arm 14d (14e), the rear surface of the ratchet-side stopper 20f formed on the inside of the cylindrical portion 20a contacts with the front surface of the body-side stopper 11e formed on the side surface of the reel lock body 11, as shown in FIG. 6.

Figure 6:
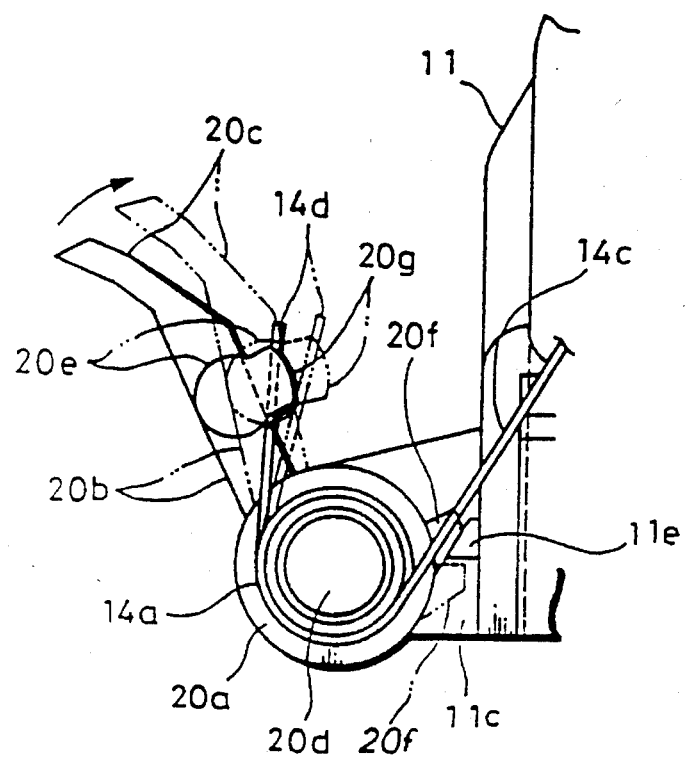
FIG. 6 is a view similar to that of FIG. 5 but showing the state in which a ratchet-side stopper is brought in contact with a body-side stopper by rotating a reel lock ratchet.

In this state, if the reel lock ratchet 12 is further rotated by application of a pressing force, then the two stoppers 11e, 20f and the support shaft 11d are twisted or distorted elastically so that the ratchet-side stopper 20f is moved to the rear surface side beyond the body-side stopper 11e as shown by a two-dot chain line in FIG. 6. In this case, since the rear surface of the ratchet-side stopper 20f and the front surface of the body-side stopper 11e are tapered, the ratchet-side stopper 20f can be easily moved over the body-side stopper 11e.

Then, when the rotational forces applied to the left and right reel lock ratchets 12, 13 are removed, the reel lock ratchets 12, 13 are rotated in the opposite direction by the spring-biasing force of the ratchet opening arm 14d (14e) to urge the front surface of the ratchet-side stopper 20f to contact with the rear surface of the body-side stopper 11e. When the ratchet-side stopper 20f and the body-side stopper 11e are engaged with each other, the ratchet opening spring 14 generates a spring force and the ratchet opening arms 14d, 14e provided at the respective ends of the spring 14 bias the ratchet portions 20c, 20c to the outside under spring force. The spring-biasing force of the ratchet opening arm 14d (14e) is not strong enough to enable the ratchet-side stopper 20f to move beyond the body-side stopper 11e. Therefore, the pair of reel lock ratchets 12, 13 can be prevented from being rotated in the returning direction by the engagement between the two stoppers 11e and 20f. Thus, the pair of reel lock ratchets 12, 13 are held in the state shown in FIG. 7.

Thus, the assembly of the reel lock mechanism 10 according to this embodiment is finished. Accordingly, the assembly of the reel lock mechanism 10 can be finished only by rotating the two reel lock ratchets 12, 13 toward the inside after the ratchet opening spring 14 has been placed on the left and right reel lock ratchets 12, 13 installed on the reel lock body 11. Therefore, the reel lock mechanism 10 can be assembled very easily.

Figure 7:
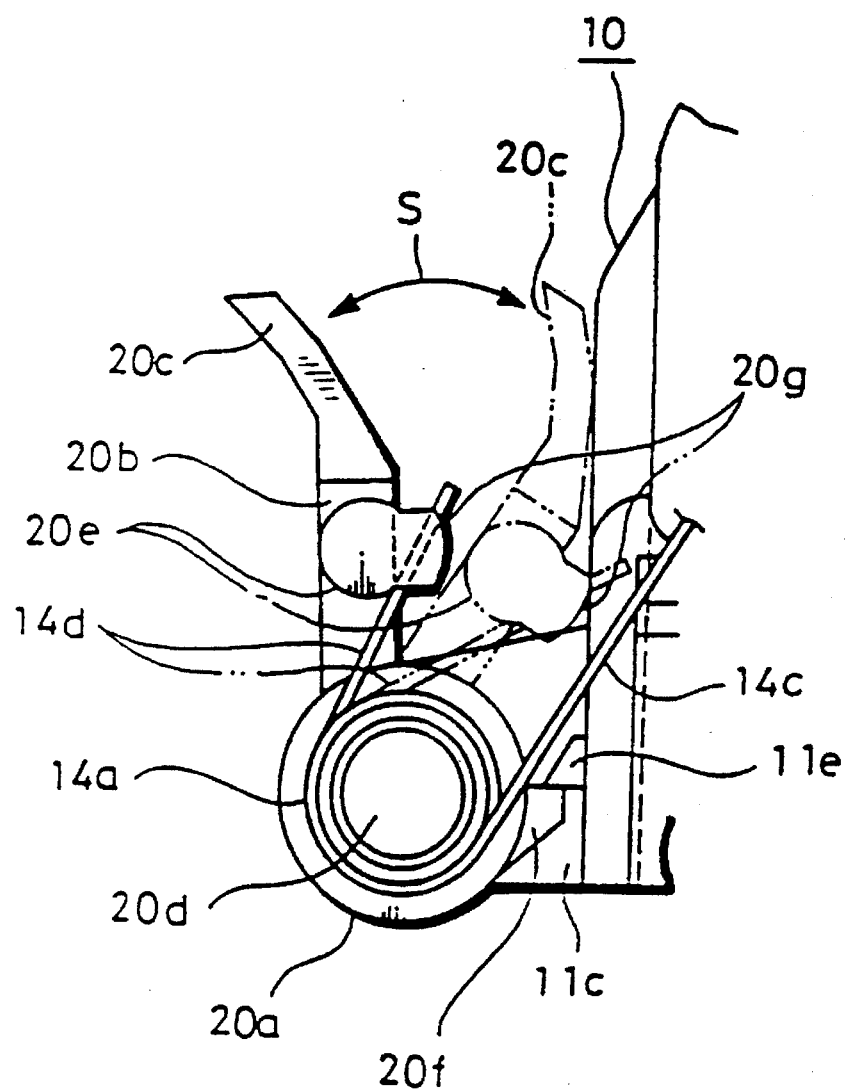
FIG. 7 is a view similar to that of FIG. 6 but showing the state that the ratchet-side stopper is moved over the body-side stopper by rotating the reel lock ratchet.

In the reel lock mechanism 10 thus assembled, each ratchet portion 20c can be rotated in a range from the state that the ratchet-side stopper 20f and the body-side stopper 11e are contacted with each other as shown by a solid line in FIG. 7 to the state that the ratchet portion 20c is pressed inwardly and brought in contact with the side surface of the reel lock body 11 as shown by a two-dot chain line in FIG. 7. This rotational range of the ratchet portion 20c corresponds to a range S in which the reel lock mechanism 10 can be used generally.

In this range S in which the reel lock mechanism 10 is in use, since the left and right reel lock ratchets 12, 13 are biased outwardly under spring-force of the ratchet opening spring 14, the reel lock ratchets 12, 13 are rotated by application of an inward pressing force against the spring force of the ratchet opening spring 14. As a consequence, the ratchet portions 20c, 20c are rotated inwardly in accordance with the magnitude of a force applied thereto.

When the reel lock mechanism 10 is accommodated within the reel lock accommodating portion 9 of the cassette hosing 1, the left and right reel lock ratchets 12, 13 whose ratchet portions 20c are opened outwardly by the ratchet opening spring 14 are biased forward under spring force of the slide spring 15, whereby the ratchet portions 20c, 20c of the left and right reel lock ratchets 12, 13 are meshed with the ratchet wheels 8, 8 formed on the outer peripheral portions of the supply-reel 2 and the take-up reel 3, as shown in FIG. 1, to thereby prevent the supply-reel 2 and the take-up reel 3 from being rotated.

While the reel lock mechanism and the method of assembling this reel lock mechanism have so far been described as applied to an audio tape cassette, the present invention is not limited thereto and can be applied to a variety of tape cassettes using a magnetic tape as a recording medium, such as an 8-mm video tape cassette, a so-called VHS tape cassette or a so-called Beta tape cassette.

As set forth, according to the present invention, the reel lock mechanism is composed of a reel lock body, a pair of reel lock ratchets and a ratchet opening spring. The ratchet opening spring is composed of supporting portions and ratchet opening arms. The pair of reel lock ratchets include ratchet-side stoppers and the reel lock body includes body-side stoppers. When the ratchet-side stoppers are engaged with the body-side stoppers, the ratchet opening spring generates a spring force to bias the pair of reel lock ratchets under spring force. Therefore, the ratchet opening spring can be attached easily. Thus, it is possible to provide a reel lock mechanism which can be assembled very easily and efficiently.

In addition, since the length of the ratchet opening arm 14d, 14e of the ratchet opening spring 14 can be reduced to the extent that the ratchet opening arm is not disengaged from the spring engagement rib 20e of the reel lock ratchet 12, 13, the length of wire material forming the ratchet opening spring can be saved. Thus, the wire material can be utilized effectively.

Since the ratchet opening spring 14 has its supporting portions formed of two coil portions 14a, 14b and the ratchet opening arms 14d, 14e are continuously connected to ends of the two coil portions, the ratchet opening spring can be formed of a single member and the ratchet opening spring can be attached to the reel lock body with ease. Moreover, the reel lock mechanism for locking tape reels can be easily and efficiently assembled.

Further, since a pair of reel lock ratchets are rotatably supported by a pair of supporting shafts of the reel lock body and a pair of ratchet opening arms 14d, 14e of the ratchet opening spring 14 are respectively engaged with the spring engagement ribs 20e, ratchet portions 20c of the pair of reel lock ratchets 12, 13 are reliably meshed with ratchet wheels 8 formed on the outer periperhal portions of the pair of reels. Therefore, it is possible to obtain a reel lock mechanism for locking tape reels in which tape reels can be reliably locked by a simple arrangement.

Furthermore, after two coil portions 14a, 14b are loosely engaged with a pair of reel lock ratchets 12, 13 pivotably mounted on a pair of support shafts 11d on reel lock body 11 under the condition that the pair of reel lock ratchets are opened larger than a range in which the reel lock ratchets are generally in use, the pair of reel lock ratchets are rotated in the above-mentioned range and the ratchet-side stoppers 20f are moved over the body-side stoppers 11e. Then, when the ratchet-side stoppers and the body-side stoppers are engaged with one another, the pair of reel lock ratchets can be prevented from being rotated and the ratchet portions 20c can be held in the above-mentioned range. Thus, the ratchet opening spring can be assembled considerably easily. Therefore, it is possible to provide a method of assembling a reel lock mechanism for tape reels in which the reel lock mechanisms can be assembled with ease and with high productivity.

Having described a preferred embodiment of the invention with reference to the accompanying drawings, it is to be understood that the invention is not limited to that precise embodiment and that various changes and modifications could be effected therein by one skilled in the air without departing from the spirit or scope of the invention as defined in the appended claims.

What is claimed is:

1. A reel lock mechanism for a tape cassette comprising:

a reel lock body which can be moved in the front and back direction with respect to a pair of tape reels on which end portions of a magnetic tape are wound;

a pair of reel lock ratchets supported on said reel lock body so as to be rotatable about supporting shafts and having ratchet portions formed at tip ends thereof; and a ratchet opening spring including two coil portions supported on shaft portions of said pair of reel lock ratchets, a coupling arm coupling together said two coil portions at one of the ends of said coil portions and ratchet opening arms extending from the other ends of said two coil portions and biasing said ratchet portions toward said pair of reels under spring force so that said ratchet portions become meshed with ratchet wheels formed around outer peripheral portions of said tape reels, wherein said pair of reel lock ratchets include ratchet-side stoppers and said reel lock body includes body-side stoppers which can be engaged with said ratchet-side stoppers under said biasing of said ratchet portions by said spring force, said supporting shafts about which said reel lock ratchets are rotatable are a pair of rotary shafts provided on said reel lock body separate from said reel lock ratchets, said pair of reel lock ratchets include spring engagement ribs, said pair of ratchet opening arms are respectively engaged with said pair of spring engagement ribs, and said shaft portions of said pair of reel lock ratchets have said two coil portions of said ratchet opening spring separately supported thereon.

2. A reel lock mechanism for a tape cassette according to claim 1, wherein said spring is a torsion coil spring.

3. A reel lock mechanism for a tape cassette according to claim 2, wherein said spring is symmetrical with respect to a center line between said pair of reels.

4. A reel lock mechanism for a tape cassette comprising:

a reel lock body which can be moved in the front and back direction with respect to a pair of tape reels on which end portions of a magnetic tape are wound;

a pair of reel lock ratchets supported on said reel lock body so as to be rotatable about respective supporting shafts and having ratchet portions formed at tip ends thereof; and a ratchet opening spring supported on shaft portions of said pair of reel lock ratchets and biasing said ratchet portions toward said pair of reels under spring force so that said ratchet portions become meshed with ratchet wheels formed around outer peripheral portions of said tape reels, wherein said ratchet opening spring includes supporting portions supported on said pair of reel lock ratchets and ratchet opening arms for biasing said ratchet portions under said spring force, said pair of reel lock ratchets include ratchet-side stoppers and said reel lock body includes body-side stoppers which can be engaged with said ratchet-side stoppers, respectively, said supporting shafts about which said reel lock ratchets are rotatable are a pair of rotary shafts provided on said reel lock body separate from said reel lock ratchets pivotally supported thereon, said pair of reel lock ratchets include respective spring engagement ribs, said pair of ratchet opening arms are respectively engaged with said spring engagement ribs, and said pair of shaft portions separately support said supporting portions of said ratchet opening spring.

5. A reel lock mechanism for a tape cassette comprising:

a reel lock body which can be moved in the front and back direction along a path extending between a pair of tape reels on which end portions of a magnetic tape are wound, said body having a pair of upstanding laterally spaced supporting shafts extending therefrom;

a pair of reel lock ratchets pivotally mounted on said supporting shafts, respectively, so as to be rotatable relative to said reel lock body and each including a ratchet portion formed at a tip end of the respective reel lock ratchet, a shaft portion coaxial with the one of said supporting shafts on which the respective reel lock ratchet is pivotally mounted, and a spring engagement rib spaced from the axis of said one supporting shaft on which the respective reel lock ratchet is pivotally mounted; and a ratchet opening spring including a pair of coil portions, a coupling arm extending between said coil portions and joined to the latter of one end at each of said coil portions so as to dispose the coil portions to be mounted on said shaft portions of the reel lock ratchets with the latter on said supporting shafts, and ratchet opening arms extending from said coil portions at the other ends of the latter and engageable with said engagement ribs of the reel lock ratchets for biasing said ratchet portions toward said pair of reels under spring force and thereby maintaining normal meshing engagement of said ratchet portions with ratchet wheels formed around outer peripheral portions of said tape reels; and wherein said reel lock ratchets and said reel lock body have respective stopper members engageable with each other for limiting the biasing of said ratchet portions under the urging of said spring force.

* * * * *